Figure 1:
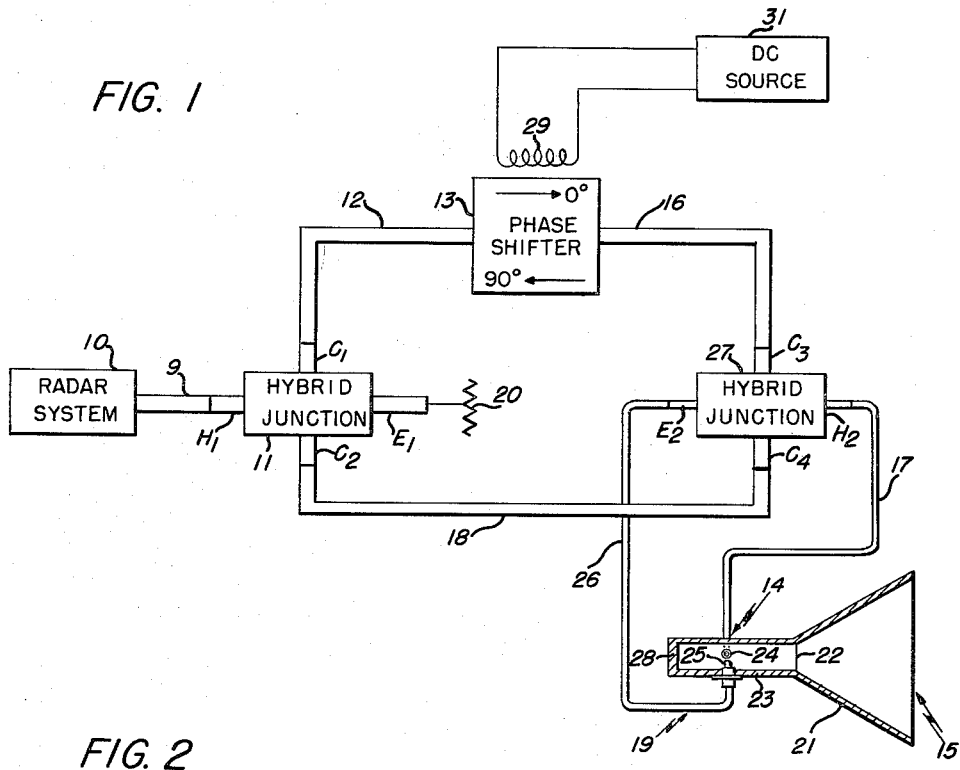

INVENTOR
WILBUR L. PRITCHARD

ATTORNEY

United States Patent Office 2,991,471
Patented July 4, 1961

2,991,471
TRANSMITTING AND RECEIVING CIRCUITS FOR WAVE TRANSMISSION SYSTEMS
Wilbur L. Pritchard, South Sudbury, Mass., assignor to Raytheon Company, a corporation of Delaware
Filed Oct. 24, 1958, Ser. No. 769,491
11 Claims. (Cl. 343—100)

The invention relates to transmitting and receiving circuits for wave transmission systems, and particularly to such circuits having a common portion or portions, such as an antenna and transmission means thereto and therefrom, for transmitting plane-polarized waves to and receiving cross-polarized waves from a wave transmission medium.

As used herein the term "plane-polarized" denotes a wave, the direction of whose electric vector remains fixed, such as, for example, horizontal, as the wave is propagated and the term "cross-polarized" denotes a wave, the direction of whose electric vector also remains fixed as the wave is propagated, but at an angle of 90° with respect to aforementioned plane-polarized wave. Therefore, if a transmitted wave is plane polarized, for example, in the horizontal direction (its electric field extends horizontally), then a cross-polarized reflected wave or cross-polarized component of the plane-polarized wave is a linear wave, the electric field of which extends vertically.

It is frequently desirable, particularly in the art of object detection and location by the transmission of electromagnetic wave energy and the observation of reflections of such transmitted energy from target objects, to propagate such wave energy in a manner that makes possible the substantial elimination of the deleterious effects of reflections from objects other than those which it is desired to detect, which might otherwise interfere with the clear indication of objects which are of interest. For example, if there are raindrops in the atmosphere through which the transmitted energy is propagated, reflections from the raindrops will be picked up by the receiver and, when supplied to an indicator, along with reflections from targets of interest, may so complicate the indication as to make it almost impossible to distinguish the significant targets from the raindrops. This difficulty has been overcome heretofore, to a greater or lesser extent, in several different ways. For example, systems using circularly polarized antennas to reject rain reflection have been built with some success. The principle of operation of such systems is based on the fact that rain reflection is specular, hence the direction of rotation of the received signal is reversed (rotates in a sense opposite to the impingent wave) and is rejected by the antenna. However, inasmuch as targets of the sort which it is normally desired to detect have a certain amount of re-polarization, which is to say, reflections from such targets comprise waves circularly polarized in the same sense as the impingent waves which produce them, such signals are accepted by the antenna, although with some loss. The practical details associated with the design of such circularly polarized antennas, particularly high aspect ratio search antennas, are formidable and consequently result in increased complexity and cost.

An alternative prior art system is the "crossed linear" system in which H polarization is transmitted and only V polarization is received. It is well known that if a plane-polarized wave impinges upon a small, almost spherical target, such as a raindrop, the reflected wave will likewise be plane-polarized, but in the sense opposite to that of the impingent wave. It is also well known that when such a signal impinges on a target of the sort which it is normally desired to detect, the reflected wave will comprise a depolarized component. Stated another way, plane-polarized reflections from targets of the sort which it is normally desired to detect will comprise waves cross-polarized or rotated 90° with respect to the polarization of the impingent waves which produced them. In such prior art "crossed linear" systems the specular rain reflection is rejected, but the depolarized component of the target reflection is accepted. However, a very practical difficulty associated with such prior art systems is the necessity for two separate receiver channels and a dual rotary joint for isolation and reception of the depolarized component of the wave reflected from the target. A more practical and economical crossed linear system utilizing a common transmission line and hence having none of the disadvantages referred to hereinabove can be accomplished as contemplated by the present invention and more thoroughly pointed out hereinbelow upon appreciation of the fact that a crossed linear system is describable as comprising a common transmission line coupled to a two-polarization feed antenna by a circulator.

Accordingly, it is an object of the present invention to provide a practical and economical two-way signal transmission system capable of radiating plane-polarized waves and receiving cross-polarized waves.

Another object of the present invention is to provide means to permit cross-linear operation without the use of separate channels.

Another object of the present invention is to provide a two-way signal transmission system, suitable for use in radar systems, which is operative to discriminate against reflections from certain undesired target objects.

A still further object of the present invention is the provision of means for improving the rain rejection ability of airport radar surveillance systems presently in service.

These objects are attained simply and efficiently in accordance with the invention in general by the use of a plane-polarized and cross-polarized feed antenna and means, such as, for example, a circulator, coupling the antenna to a common transmission line such that the signals to be transmitted are supplied only to the plane polarization feed, for example, and only received signals from the crossed polarization feed are supplied to the common transmission line.

In one embodiment of the invention the vertical or cross-polarized feed and the horizontal or plane-polarized feed of an antenna are respectively connected to the E and the H plane arms of a hybrid junction, the balanced or coplanar arms of which are connected to the balanced or coplanar arms of a second hybrid junction. The E plane arm of the second hybrid junction is terminated in a suitable load, and H plane arm of the second hybrid junction is connected to and forms a part of a common transmission line of a conventional radar system, and disposed in a transmission line connecting two of the coplanar arms of the hybrid junctions is a differential phase shifter providing a phase shift such that the phase of a signal passing therethrough in the direction of the antenna suffers no change, but the phase of a signal traveling in the opposite direction is shifted by 180°. Owing to the specific relation of the two hybrid junctions and the differential phase shifter, the signal to be transmitted is applied only to the H plane arm of the first hybrid junction, thence through the horizontal or plane polarization feed, and thereafter radiated as a plane-polarized wave; but a plane-polarized reflected wave, because of the 180° phase shift introduced by the differential phase shifter, is absorbed in the E plane arm of the second hybrid junction. However, a signal received on the vertical or cross-polarized feed is supplied to the balanced coplanar arms of the second hybrid junction and, owing to the 180° phase shift introduced by the differential phase shifter, this signal is received by and passes through the H plane arm of the second hybrid junction to the common transmission line.

It is to be understood that although the hybrid junctions forming a part of the invention are described herein for purposes of illustration as being of the magic T type, no limitation is intended in this respect. Suitable conventional hybrid junctions having, for example, balanced arms as distinguished from coplanar arms, may be used.

In the preferred embodiment of the invention for use, for example, when frequency or power limitations limit or prevent the use of a differential phase shifter or the like, two conventional TR (transmit-receive) switches are interposed at a particular location one with the other between the balanced or coplanar arms of two suitable hybrid junctions, one of which has its E plane arm terminated in a suitable load and its H plane arm connected to a vertical polarization feed of the antenna, and the other of which has its E plane arm connected to the horizontal polarization feed of the two-polarization feed antenna and its H plane arm connected to a common transmission line. If the distance in terms of wave length between the hybrid junctions taken along each pair of coplanar arms containing a TR switch is the same and one TR switch is located a quarter wave length further distant from one hybrid junction than the other TR switch, a signal to be transmitted is supplied, for example, to the horizontal polarization feed and only reflected signals received by the vertical polarization feed are supplied to the common transmission line.

Figure 2:
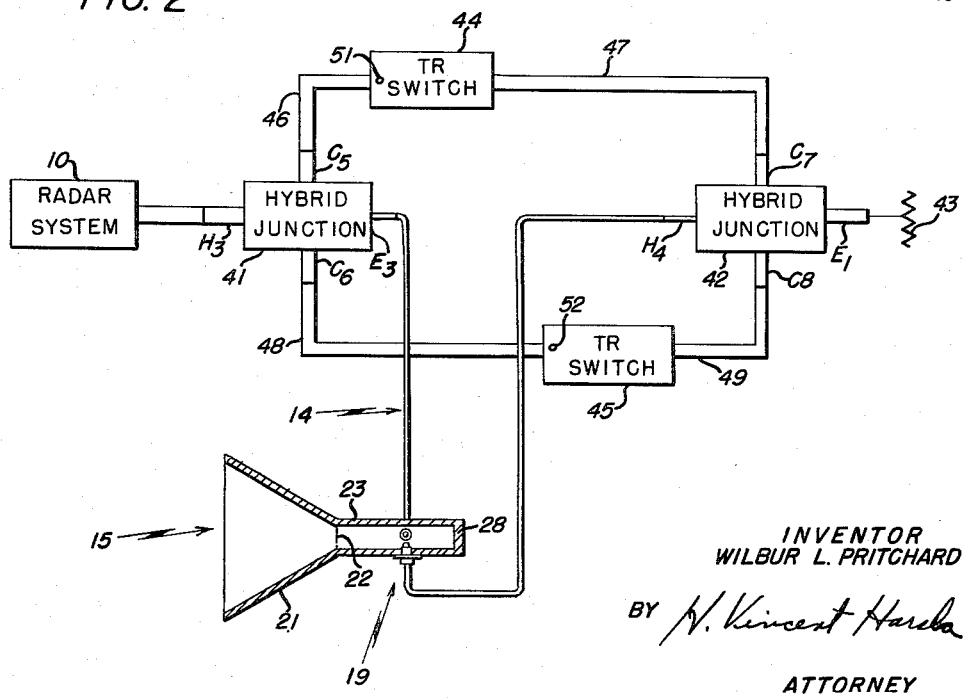

These and other features and objects of the invention are described in the following detailed description and are illustrated in the accompanying drawing, in which:

FIG. 1 is a block diagram, partly in section, of the invention, incorporating a circulator and a two-polarization feed antenna; and FIG. 2 is a block diagram, partly in section, of another embodiment of the invention, utilizing TR switches.

With reference now to FIG. 1 which shows one embodiment, the general scheme of the invention is that a relatively simple antenna means is coupled to a common transmission line by a circulator comprising a differential phase shifting device or gyrator operatively disposed between two conventional hybrid junctions in such a manner that energy to be transmitted from the common transmission line is supplied, for example, only to a horizontal polarization feed circuit and only the cross-polarized component of the reflected wave is supplied to the common transmission line which is connected to a conventional radar system adapted to transmit and receive wave energy. The coupling means (not shown) for coupling the radar system to the common transmission line may be conventional. While the elements connecting the various parts of the invention are referred to as lines, it is to be understood that this term is used in its broadest sense to cover all forms of transmission media in which the transmitted energy follows a limited predetermined path and includes wave guides, dual transmission lines, coaxial lines and the like.

In a conventional hybrid junction, when energy is fed to one of its four arms, such as, for example, arm $C_1$ of FIG. 1, half of the energy emerges from each of the two other arms $E_1$ and $H_1$. Nothing emerges from arm $C_2$. If energy is fed into arm $C_2$, half of the energy also emerges from each of the arms $E_1$ and $H_1$, but the phase of the energy coming from one of the arms $E_1$ or $H_1$ is at some specified distance from the junction 180° out of time phase from what it was at this same specified distance when energy was fed to arm $C_1$. No energy emerges from arm $C_1$ in such a situation. From the above, it follows that the balanced or coplanar arms $C_1$ and $C_2$ may be considered a pair of symmetrical arms. Likewise, arms $E_1$ and $H_1$ may also be considered a pair of symmetrical arms, since they react just like arms $C_1$ and $C_2$. That is, if energy is fed into arm $E_1$, half of this energy emerges from each of the coplanar arms $C_1$ and $C_2$, but none from arm $H_1$, and at some specified distance from the junction the waves in arms $C_1$ and $C_2$ will be 180° out of phase. However, if energy is fed into arm $H_1$, then at this same specified distance the waves in arms $C_1$ and $C_2$ will be in phase. In hybrid junctions, if equal amounts of energy are fed in time phase simultaneously to any pair of symmetrical arms, the sum total of the two energies will emerge from only one of the other symmetrical arms and nothing will emerge from the fourth arm. If the time phase of the energy fed to one of the arms is reversed 180°, then the sum total of the two energies will emerge from the arm from which nothing emerged before. From what has been said, it is clear that in the latter situation no energy will emerge from the other symmetrical arm.

Referring now to FIG. 1, during transmission the transmitted power introduced into the common transmission line 9 from the radar system 10 is divided into two equal parts in a conventional hybrid junction 11, such as, for example, of the magic T type. Half of the power proceeds through the transmission line 12 from coplanar arm $C_1$ to the gyrator or phase shifting device 13 and without suffering any phase shift, thence to the horizontal polarization feed 14 of the antenna 15 through transmission line 16, coplanar arm $C_3$, H plane arm $H_2$, and transmission line 17. The other half of the power emerges from coplanar arm $C_2$ and by means of transmission line 18 and coplanar arm $C_4$ is carried to H plane arm $H_2$ where the two halves are combined in phase and radiated as a plane-polarized wave. It is to be noted that due to the orientation of the E plane arm $E_1$ of the hybrid junction 11, no transmitted power is coupled to the vertical polarization feed 19 of the antenna 15 and hence only horizontally polarized waves are radiated. FIGS. 1 and 2 of the drawing show a directive horn 21 which is preferably of a cross section that is indifferent to polarization, e.g., square. The horn 21 may be used either for receiving or transmitting, or both simultaneously. It is tapered from the large mouth opening to a smaller throat opening in accordance with the principles of horn design well know in the art. To the small end or throat 22 of the horn 21 is connected a section of wave guide 23 preferably square in cross section and of sufficient length to allow the orientation of transmitted and reflected waves.

Within the wave guide 23 there are located two small antennas 24—25 at right angles to each other which are respectively coupled by means of transmission lines 17—26 to the H and E plane arms $H_2$—$E_2$ of hybrid junction 27. For transmission, the proper antenna, such as, for example, antenna 24, establishes the desired wave in the wave guide 23, whereas in reception both antennas 24—25 are responsive to the wave arriving there from a distant location. As shown in FIG. 1, the vertically disposed antenna 25 is receptive to vertically polarized waves and the horizontally disposed antenna 24 is receptive to horizontally polarized waves. The far end of the wave guide is closed by conducting plate 28 which is spaced from the antennas 24—25 a distance of the order of a quarter wave length, the exact distance being determined by considerations of impedance matching. It is preferably so chosen that the resultant impedance of an exciting antenna is equal to the surge impedance of its respective transmission line whereby reflections of energy along each transmission line are avoided. It may now be apparent that the antenna is receptive to both vertical and horizontal polarized waves.

The conventional differential phase shifter or gyrator 13 shown in block form in FIG. 1 may, for example, consist of a short section of circular wave guide (not shown) in which a small circular core of ferrite material is axially carried in a coaxial cylinder of dielectric material. A concentric coil of wire 29 show diagrammatically in FIG. 1 is wound around the outside of the circular wave guide and serves as a means for producing a controllable axial magnetic field in the ferrite core. Coil 29 is connected to a conventional D.C. current supply 31. By the use of properly oriented rectangular wave guides, as is well known in the art, one of which is provided with a suitable 90° twist, the screw rotation introduced by the twisted rectangular guide adds to the 90° rotation given to a wave by the ferrite element, making a total rotation of 180°. For a wave traveling in the reverse direction, these two rotations cancel each other, producing a net zero rotation through the gyrator. A differential phase shifter 13 constructed, for example, as described hereinabove, is adapted and arranged to provide a net zero rotation for waves propagated from hybrid junction 11 and 180° rotation for waves propagated from hybrid junction 27, i.e., net zero rotation for transmitted waves and 180° rotation for reflected waves. Other types of differential phase shifter may be used if desired. When the transmission lines 12—16 and 18 are of equal length in terms of wave length of the transmitted signal and with a differential phase shifter available as explained above, it follows that a horizontally polarized wave leaving H plane arm $H_2$ will be divided in hybrid junction 27 and appear at coplanar arms $C_1$—$C_2$ as equal but oppositely polarized waves due to the action of the differential phase shifter 13. These oppositely polarized waves will be accepted and absorbed by the load 20 in E plane arm $E_1$. However, due to the action of the differential phase shifter 13, a cross-polarized wave leaving E plane arm $E_2$ will, because of the 180° shift of phase introduced by the differential phase shifter 13, appear at H plane arm $H_1$ as two equal signals having the same polarization and hence will be accepted by H plane arm $H_1$ and common transmission line 9. In view of the preceding discussion, it may now be apparent that there is provided a two-way transmission system that will transmit in one direction, for example, horizontally polarized waves, and will transmit in the opposite direction only cross or vertically polarized waves.

Because of the many disadvantages inherent in the use of differential phase shifters due, for example, to frequency and power limitations, application of the embodiment shown in FIG. 1 has certain practical limitations. A preferred embodiment of the invention, shown in FIG. 2, not subject to the limitations of differential phase shifters, will now be described. The radar system, common transmission line, two-polarization feed antenna and the hybrid junctions may be substantially identical to that shown in FIG. 1 and described hereinbefore, hence a description thereof will not be repeated here. However, the location and use of TR switches and the coupling of the hybrid junctions one with another and with the antenna are different and require explanation.

With reference now to FIG. 2, the H plane arm $H_3$ of hybrid junction 41 is connected to a common transmission line 9 and the E plane arm $E_3$ is connected to, for example, the horizontal polarization feed 14 of antenna 15. The E plane arm $E_4$ of hybrid junction 42 is terminated in a suitable load 43, and the H plane arm $H_4$ is connected to the vertical polarization feed 19 of the antenna 15. Disposed between each pair of coplanar arms $C_5$—$C_6$ and $C_7$—$C_8$ of the conventional hybrid junctions 41—42 of any suitable type are conventional TR switches 44—45. Each TR switch 44—45 is respectively connected to its pair of coplanar arms $C_5$—$C_7$ and $C_6$—$C_8$ by suitable transmission lines 46—47 and 48—49 of the same total wave length. However, it is to be particularly noted that one of the TR switches, such as, for example, TR switch 45, is located a distance from, for example, hybrid junction 41 one-quarter wave length greater than the distance from hybrid junction 41 to TR switch 44. If desired, ATR switches may be substituted for the TR switches.

The operation of the embodiment shown in FIG. 2 is as follows. Owing to the fact that TR switch 45 is located a quarter wave further distant from hybrid junction 41 than is TR switch 44, when a wave is propagated toward H plane arm $H_3$ and is split by coplanar arms $C_5$—$C_6$, the wave traveling through each said arm causes the TR switch connected to that arm to fire and reflect both waves back to H plane arm $H_3$, the phase of one wave with respect to the other being shifted 180°. Consequently, both waves are combined and accepted by E plane arm $E_3$ and subsequently radiated by the antenna 15 as, for example, a horizontally polarized wave. Because of the action of the TR switches 44—45, no power is supplied to hybrid junction 42. Obviously, because of the construction of the antenna it is receptive to not only vertically polarized waves, but also horizontally polarized waves. However, as will now be pointed out, horizontally polarized waves, i.e., waves having the same polarization as those transmitted, are not supplied to the radar system. A wave received by E plane arm $E_3$ is split and coupled only to the coplanar arms $C_5$—$C_6$. Since these signals are 180° out of phase, and their amplitudes are insufficient to fire TR switches 44—45, they are not accepted by the radar system 10, but are accepted by and absorbed in the E plane arm $E_4$ of hybrid junction 42. A wave that is vertically polarized and received by H plane arm $H_4$ is split in hybrid junction 42 and coupled only to the coplanar arms $C_7$—$C_8$. Since the polarization of these signals are in phase and their amplitudes are also insufficient to fire TR switches 44—45, they are accepted by the H plane arm $H_3$ of hybrid junction 41 and coupled to the common transmission line 9 and consequently supplied to the radar system 10 in the conventional manner.

It is to be especially noticed, and, in view of the preceding discussion it may now be readily apparent, that if solenoid operated shorting pins 51—52, or the like, are provided to selectively short circuit the transmission lines directly in front of or at each TR switch 44—45, power will be, for example, supplied to and from the radar system 10 through the horizontal polarization feed 14 only, and that any reflected waves present in the vertical polarization feed 19 will be absorbed in the E plane arm $E_4$ of the hybrid junction 42 as and for substantially the same reasons set forth hereinabove with regard to the propagation of transmitting energy from common transmission line 9 during cross-polarized operation. The provision of shorting pins, either integral with or separate from the TR switches, allows selection of either plane- or cross-polarized operation and therefore provides simple and economical means for rendering present radar systems more versatile.

Although I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a two-way signal transmission system the combination comprising: a common antenna adapted to transmit plane-polarized signals and receptive of cross-polarized signals; common transmission means for transmitting signals to and from said antenna; and means connecting said antenna and said common transmission means including first and second four terminal hybrid junctions each having a first pair of symmetrical arms in electrical communication and signal modifying means connected between said junctions for modifying the electrical characteristics thereof, one of the remaining terminals being connected to said common transmission means, another being terminated in a suitable load and the remaining two terminals being connected to said antenna for presenting a signal to said antenna and cross-polarized signals from said antenna.

2. In a two-way signal transmission system the combination comprising: a common antenna adapted to transmit plane-polarized signals and receptive of cross-polarized signals; common transmission means for transmitting signals to and from said antenna; and means common to and connecting said antenna and said common transmission means including first and second four terminal hybrid junctions each having a first pair of symmetrical arms in electrcal communication and signal modifying means connected between said junctions for modifying the electrical characteristics thereof, one of the remaining terminals being connected to said common transmission means, another being terminated in a suitable load and the remaining two terminals being connected to said antenna for presenting signals to said antenna and substantially only cross-polarized signals from said antenna.

3. In a two-way signal transmission system the combination comprising: an antenna having first means for transmitting plane-polarized signals and second means for receiving cross-polarized signals; common transmission means for transmitting signals to and from said antenna; and means connecting said common transmission means and said first and second means including first and second four terminal hybrid junctions each having one pair of similar symmetrical arms in electrical communication and means connected between at least two arms of said pair of symmetrical arms for changing the operational characteristics of said hybrid junctions, one of said remaining terminals being coupled to said common transmission means, another of said terminals being terminated in a suitable load, and the remaining two terminals being each connected to respectively said antenna first and second means for supplying a signal to said first means and a signal from said second means.

4. In a two-way signal transmission system the combination comprising: an antenna having first means for transmitting plane-polarized signals and second means for receiving cross-polarized signals; common transmission means for transmitting signals to and from said antenna; and circulator means connecting said common transmission means and said first and second means, said circulator means comprising a first hybrid junction having a first and second pair of symmetrical arms, one of said first pair being connected to said common transmission means and the other being terminated in a suitable load, a second hybrid junction having third and fourth symmetrical arms, one of said third pair of symmetrical arms being connected to said antenna first means and the other arm to the said antenna second means, said second and fourth pair of symmetrical arms being similar and in electrical communication, and phase shifting means connected between two arms of said second and fourth pairs of symmetrical arms whereby said circulator means supplies signals from said common transmission means to said first means and signals from said second means to said common transmission means.

5. In a two-way signal transmission system the combination comprising: an antenna having first means for transmitting plane-polarized signals and second means for receiving cross-polarized signals; common transmission means for transmitting signals to and from said antenna; and common circulator means coupling said common transmission means to said first and second means, said circulator means comprising a first hybrid junction having a first and second pair of symmetrical arms, one of said first pair being connected to said common transmission means and the other being terminated in a suitable load, a second hybrid junction having third and fourth symmetrical arms, one of said third pair of symmetrical arms being connected to said antenna first means and the other arm to the said antenna second means, said second and fourth pairs of symmetrical arms being similar and each arm of said second pair of symmetrical arms being in electrical communication with a different one of said fourth pair of symmetrical arms, and differential phase shifting means connected between two arms of said second and fourth pairs of arms for reversing the phase of signals propagated therethrough in the direction of said first hybrid junction whereby said common circulator means couples signals from said common transmission line to substantially only said first means and couples substantially only signals from said second means to said common transmission means.

6. In a two-way signal transmission system the combination comprising: an antenna having first means for transmitting plane-polarized signals and second means for receiving cross-polarized signals; a first hybrid junction including a first and second pair of symmetrical arms, one of said first pair of symmetrical arms being connected to said first means; a second hybrid junction including a third and fourth pair of symmetrical arms, one of said third pair of symmetrical arms being connected to said second means and the other being terminated in a suitable load; and means disposed between said second and fourth pairs of symmetrical arms for causing high amplitude signals incident on said second pair of symmetrical arms to be received by said first means.

7. In a two-way signal transmission system the combination comprising: an antenna having first means for transmitting plane-polarized signals and second means for receiving cross-polarized signals; a first hybrid junction including a first and second pair of symmetrical arms, one of said first pair of symmetrical arms being connected to said first means; a second hybrid junction including a third and fourth pair of symmetrical arms, one of said third pair of symmetrical arms being connected to said second means and the other being terminated in a suitable load; common transmission means connected to the other of said first pair of symmetrical arms; and means connected between said second and fourth pairs of symmetrical arms for reflecting in phase opposition high amplitude signals incident on said second pair of symmetrical arms.

8. In a two-way signal transmission system the combination comprising: an antenna having first means for transmitting plane-polarized signals and second means for receiving cross-polarized signals; a first hybrid junction including a first and second pair of symmetrical arms, one of said first pair of symmetrical arms being connected to said first means; a second hybrid junction including a third and fourth pair of symmetrical arms, one of said third pair of symmetrical arms being connected to said second means and the other being terminated in a suitable load; common transmission means connected to the other of said first pair of symmetrical arms; and signal reflecting means actuated by high amplitude signals connected between said second and fourth pairs of symmetrical arms for reflecting in phase opposition high amplitude in phase signals incident on said second pair of symmetrical arms from said common transmission line whereby said signals may be received by said first means.

9. In a two-way signal transmission system the combination comprising: an antenna having first means for transmitting plane-polarized signals and second means for receiving cross-polarized signals; a first hybrid junction including a first and second pair of symmetrical arms, one of said first pair of symmetrical arms being connected to said first means; a second hybrid junction including a third and fourth pair of symmetrical arms, one of said third pair of symmetrical arms being connected to said second means and the other being terminated in a suitable load; common transmission means connected to the other of said first pair of symmetrical arms for transmitting signals to and from said antenna; first signal reflecting means actuated by high amplitude signals connected between one each of said second and fourth pairs of symmetrical arms for reflecting signals back to its said second symmetrical arm in phase with signals incident thereon; and second signal reflecting means actuated by high amplitude signals connected between each of the other arms of said second and fourth pairs of symmetrical arms for reflecting signals back to its said second symmetrical arm in phase opposition with signals incident thereon whereby only high amplitude signals transmitted to the said antenna from the said common transmission means are received by said first means and only reflected signals received by said second means are transmitted from said antenna to said common transmission means.

10. In a two-way signal transmission system the combination comprising: an antenna having first means for transmitting plane-polarized signals and second means for receiving cross-polarized signals; a first hybrid junction including a pair of balanced arms, an H plane arm and an E plane arm, said E plane arm being connected to said antenna first means; a second hybrid junction including a pair of balanced arms, an H plane arm connected to said antenna second means and an E plane arm terminated in a suitable load; a first TR switch connecting one arm each of said first and second hybrid junction balanced arms; a second TR switch connecting the other arms of said first and second hybrid junction balanced arms, one of said TR switches being disposed a quarter wave length further distant from said first hybrid junction than the other TR switch; common transmission means connected to the H plane arm of said first hybrid junction; and means for selectively providing at each of said TR switches a short circuit to both high and low amplitude signals.

11. In a two-way signal transmission system the combination comprising: an antenna having first means for transmitting plane-polarized signal and second means for receiving cross-polarized signals; a first hybrid junction including a first and second pair of symmetrical arms, one of said first pair of symmetrical arms being connected to said first means; a second hybrid junction including a third and fourth pair of symmetrical arms, one of said third pair of symmetrical arms being connected to said second means and the other being terminated in a suitable load; common transmission means connected to the other of said first pair of symmetrical arms; third means connected between said second and fourth pairs of symmetrical arms for reflecting in phase opposition high amplitude signals incident on said second pair of symmetrical arms; and means for selectively providing at said third means a short circuit to both high and low amplitude signals.

References Cited in the file of this patent
UNITED STATES PATENTS 2,619,635  Chait _____ Nov. 25, 1952

UNITED STATES PATENT OFFICE
CERTIFICATE OF CORRECTION

Patent No. 2,991,471 July 4, 1961

Wilbur L. Pritchard

It is hereby certified that error appears in the above numbered patent requiring correction and that the said Letters Patent should read as corrected below.

Column 2, line 8, for "spearate" read -- separate --; line 50, for "and" read -- the --; column 7, line 6, for "electrcal" read -- electrical --; column 10, line 5, for "signal" read -- signals --.

Signed and sealed this 21st day of November 1961.

(SEAL)
Attest:

ERNEST W. SWIDER
Attesting Officer

DAVID L. LADD
Commissioner of Patents
USCOMM-DC